(12) United States Patent
Penzkofer et al.

(10) Patent No.: US 12,291,298 B2
(45) Date of Patent: May 6, 2025

(54) APPARATUS FOR FIXING A DISPLAY DEVICE ON A STEERING ELEMENT

(71) Applicant: Robert Bosch GmbH, Stuttgart (DE)

(72) Inventors: Matthias Penzkofer, Stuttgart (DE); Ute Luetze, Unterensingen (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 18/187,197

(22) Filed: Mar. 21, 2023

(65) Prior Publication Data

US 2023/0303006 A1 Sep. 28, 2023

(30) Foreign Application Priority Data

Mar. 25, 2022 (DE) .................... 10 2022 202 974.7

(51) Int. Cl.
*B62J 11/00* (2020.01)
*B60R 11/00* (2006.01)
*B62J 50/21* (2020.01)

(52) U.S. Cl.
CPC ......... *B62J 11/00* (2013.01); *B60R 2011/001* (2013.01); *B60R 2011/0059* (2013.01); *B62J 50/225* (2020.02)

(58) Field of Classification Search
CPC ... B62J 11/00; B62J 50/225; B60R 2011/001; B60R 2011/0059
USPC ........................ 224/420, 558, 448; D16/242; 248/226.11, 227.3, 227.4
See application file for complete search history.

(56) References Cited

U.S. PATENT DOCUMENTS

| | | | | |
|---|---|---|---|---|
| 4,819,217 A | * | 4/1989 | Houlihan | B62J 45/20 968/398 |
| 5,332,183 A | * | 7/1994 | Kagayama | B62J 6/03 248/223.41 |
| 5,735,441 A | * | 4/1998 | Fujimoto | B62J 11/00 224/420 |
| 5,860,728 A | * | 1/1999 | Maglica | F16M 11/2078 362/396 |
| 6,186,383 B1 | * | 2/2001 | Kobdish | B62J 11/00 248/214 |
| 6,557,437 B2 | * | 5/2003 | Masui | B62J 50/225 74/551.8 |
| D553,485 S | * | 10/2007 | Hall | D8/396 |
| 8,596,506 B2 | * | 12/2013 | Yu | B62J 11/00 224/419 |
| 8,616,507 B2 | * | 12/2013 | Willey | B62D 65/06 248/74.1 |

(Continued)

FOREIGN PATENT DOCUMENTS

AT 500 448 A1 12/2005
DE 200 12 663 U1 10/2000

*Primary Examiner* — Justin M Larson
(74) *Attorney, Agent, or Firm* — Maginot, Moore & Beck LLP

(57) ABSTRACT

An apparatus for fixing a device, in particular in the form of a display device, to an element, in particular to a handlebar of a single-lane vehicle, is disclosed. The apparatus includes a holding device, which is fixed to the element in a closed state. The apparatus further includes a fixing device, which is arranged on the holding device and which is configured to fix the device. And by way of a fixing element which is arranged jointly, in particular releasably, the holding device can be held in a closed state and the device is fixed to the fixing device.

21 Claims, 2 Drawing Sheets

(56) References Cited

U.S. PATENT DOCUMENTS

| | | | | |
|---|---|---|---|---|
| 8,651,350 B2* | 2/2014 | Onogi | ............... | B62J 50/225 |
| | | | | 224/419 |
| 8,800,830 B2* | 8/2014 | Hoshi | ............... | B62K 11/14 |
| | | | | 224/450 |
| 9,402,016 B1* | 7/2016 | Hidalgo | ............ | H04N 23/51 |
| 9,701,354 B2* | 7/2017 | Cheng | ............... | B62J 6/03 |
| D798,939 S * | 10/2017 | Costa | ............... | D16/242 |
| D798,940 S * | 10/2017 | Costa | ............... | D16/242 |
| D869,545 S * | 12/2019 | Lee | ............... | D16/242 |
| 11,122,156 B2* | 9/2021 | Liu | ............... | F16M 11/041 |
| 11,554,827 B2* | 1/2023 | Wattrus | ............ | B62J 50/225 |
| D998,483 S * | 9/2023 | Mendez | ............ | D10/103 |
| D1,002,358 S * | 10/2023 | Ribeiro | ............ | D8/396 |
| 12,043,189 B2* | 7/2024 | Saito | ............... | H02G 3/32 |
| 2005/0109808 A1* | 5/2005 | Ueda | ............... | B62J 6/03 |
| | | | | 224/420 |
| 2010/0200630 A1 | 8/2010 | Yu et al. | | |
| 2012/0074282 A1* | 3/2012 | Willey | ............ | B60J 1/004 |
| | | | | 29/525.02 |
| 2023/0257050 A1* | 8/2023 | Hulme | ............ | F16M 11/041 |
| | | | | 224/420 |

\* cited by examiner

APPARATUS FOR FIXING A DISPLAY DEVICE ON A STEERING ELEMENT

This application claims priority under 35 U.S.C. § 119 to patent application no. DE 10 2022 202 974.7, filed on Mar. 25, 2022 in Germany, the disclosure of which is incorporated herein by reference in its entirety.

BACKGROUND

The disclosure relates to an apparatus for fixing a device, in particular in the form of a display device, on an element, in particular a handlebar of a single-lane vehicle, comprising a holding device that is fixed to the element in a closed state and a fixing device which is arranged on the holding device and which is configured to fix the device.

The disclosure further relates to a fixing system, comprising a device, in particular a display device, a holding device which can be fixed in a closed state on an element, in particular to a handlebar of a single-lane vehicle, and a fixing device which is arranged on the holding device and which is configured to fix the device.

The disclosure further relates to a steering element system for a single-lane vehicle comprising a fixing system and a steering element of the single-lane vehicle.

From US 2010/0200630 A1, an adapter for fixing additional equipment on a cycle has become known. The adapter includes a clamp for attaching to a cycle handlebar having two coaxial through-holes. An adapter may be mounted on the clamp, which also has a coaxial through-hole. A screw is guided through these through-holes to fix all the objects simultaneously. An accessory can now be mounted on the adapter, for example, a heart rate monitor, speedometer, or GPS device.

SUMMARY

In one embodiment, the present disclosure provides an apparatus for fixing a device, in particular in the form of a display device, to an element, in particular a handlebar, of a single-lane vehicle, comprising a holding device, which is fixed to the element in a closed state, a fixing device, which is arranged on the holding device and which is configured to fix the device, and wherein by means of a fixing element which is arranged jointly, in particular releasably, the holding device can be held in a closed state and the device is fixed to the fixing device.

In one embodiment, the present disclosure provides a fixing system, comprising a device, in particular in the form of a display device, a holding device, which in a closed state can be fixed to an element, in particular a handlebar, of a single-lane vehicle, and a fixing device, which is arranged on the holding device and which is configured to fix the device, and wherein by means of a fixing element which is arranged jointly, in particular releasably, the holding device can be fixed to the element and the device can be fixed to the fixing device.

In one embodiment, the present disclosure provides a steering element system for a single-lane vehicle comprising a fixing system and a steering element of the single-lane vehicle, wherein the holding device can be arranged on the steering element for, in particular, positive locking.

One of the advantages achieved is a simple and quick fixing. At the same time, the fixing is inexpensive and reliable because the number of components has been reduced compared to previously known apparatuses.

Further features, advantages, and additional embodiments of the disclosure are described below or will be disclosed thereby.

According to an advantageous further development of the disclosure, the fixing device is configured for a positively locking reception of the device. One of the advantages achieved is that simple and at the same time reliable reception of the device is made possible, while still providing a superior visual appearance. Likewise, twisting of the device in the fixing device is avoided.

According to a further advantageous development of the disclosure, the holding device is configured in the form of a clamp. This allows for a simple and quick fixing of the holding device, for example on a handlebar of a cycle.

According to a further advantageous further development of the disclosure, the clamp is configured at least in two parts with at least two parts. This allows a particularly simple fixing of the holding device.

According to a further advantageous development of the disclosure, at least two of the parts are pivotable with respect to one another. This allows a high user satisfaction while still reliably fixing the holding device. For example, by simply pivoting the two parts, a user can attach the clamp to a handlebar or the like without having to lose a part or intricately manually arrange the parts.

According to a further advantageous further development of the disclosure, the joint fixing element is configured to provide a threaded connection, a spread connection and/or a latch connection. The advantage of this is that a reliable yet cost-effective, easy-to-handle, releasable connection is provided.

According to a further advantageous development of the disclosure, the holding device is made of flexible material, in particular plastic. In this way, an inexpensive manufacture and simple arrangement of the holding device is possible.

According to a further advantageous development of the disclosure, the holding device comprises a first opening for receiving the joint fixing element in a direction comprising a second opening along the direction. In this way, a high ease of use is achieved in the arrangement of the holding device and in the fixing thereof. Through the lateral opening, for example, a threaded element can be recessed or laterally inserted into the first opening, so that the user can insert the screw element into the first opening without having to bend down or the like.

Further important features and advantages of the disclosure arise from the drawings, and from the accompanying description of figures aided by the drawings.

It is understood that the aforementioned features and the features yet to be explained hereinafter can be used not only in the respectively specified combination, but also in other combinations, or alone, without departing from the scope of the present disclosure.

Preferred embodiments and embodiment variations of the disclosure are set forth in the drawings and will be explained in greater detail in the following, whereby like reference numerals refer to equal or similar or functionally equal components or elements.

BRIEF DESCRIPTION OF THE DRAWINGS

In this respect, in schematic form.

DETAILED DESCRIPTION

Figure 1:
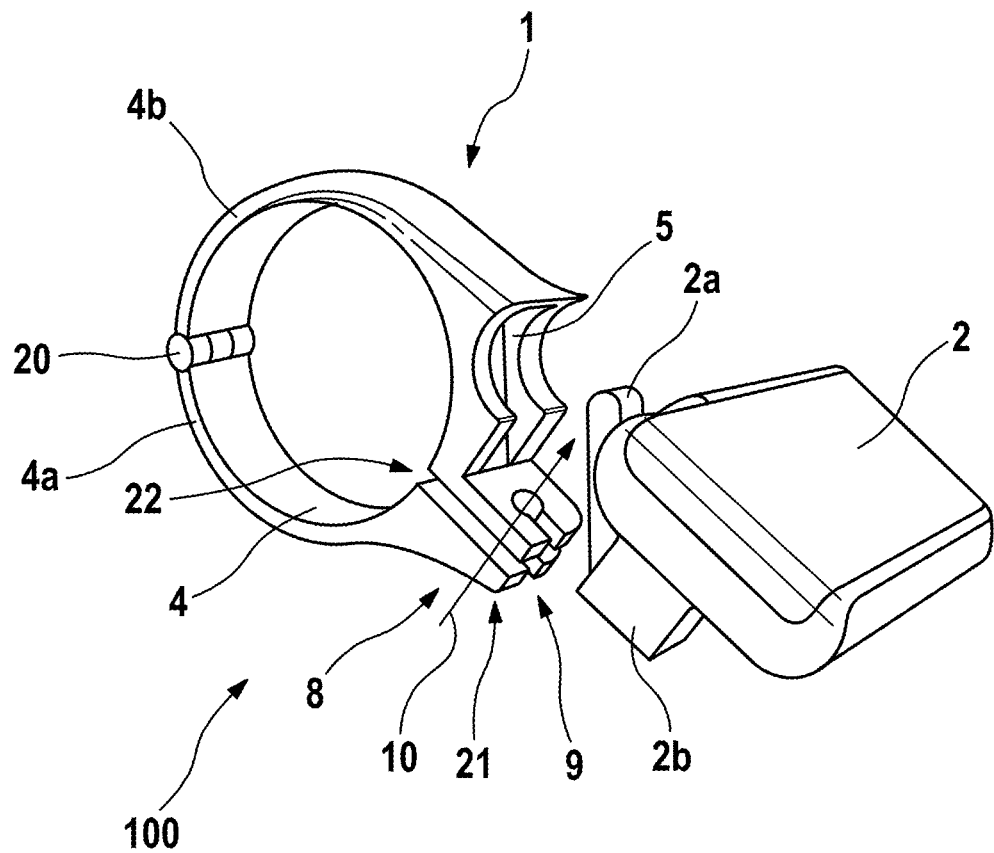
FIG. 1 shows a steering element system in perspective view in accordance with an embodiment of the present disclosure.
Figure 2:
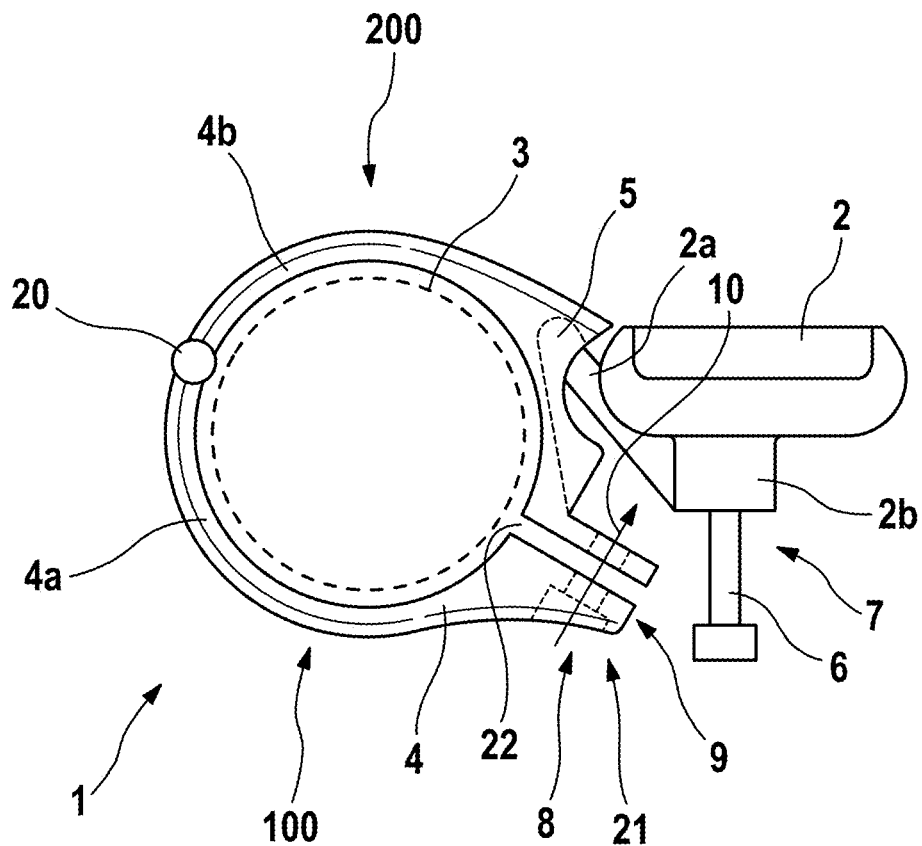
FIG. 2 shows the steering element system of FIG. 1 in cross-section.

In FIG. 1, a steering element system is shown in perspective view in accordance with one embodiment of the present disclosure and is shown in cross-section in FIG. 2.

In FIG. 1, a steering element system 200 is shown, comprising a display 2, which can be fixed via an annular holding device 4 of a fixing system 100 to a steering rod (not shown in FIG. 1) of a cycle (not shown). The holding device 4 is configured in the form of an annular clamp made of plastic. Furthermore, a recess 5 is arranged on the clamp 4, which allows a positive locking in the upper region with the display 2, which is configured by means of a projection 2a for the corresponding engagement with the recess 5. The positive locking prevents in particular twisting of the display 2 in the holding device 4.

In the lower part, the display 2 comprises a straight projection 2b for the flat abutment on a radial projection 21 of the clamp 4. In this region 22, the clamp 4 is interrupted in the circumferential direction. In the embodiment of FIGS. 1 and 2, the clamp 4 is designed in two parts with two parts 4a, 4b, which can be pivoted with respect to one another by means of a hinge 20, for example to simplify an arrangement of the clamp 4 on a handlebar 3 (see FIG. 2). An internal thread (not shown) for providing a threaded connection 7, which serves to receive a screw 6, is also arranged in the region 2b.

To fix the display 2, the clamp 4 in the radial projection 21 now comprises a through-hole 8 that extends substantially tangentially (direction 10) on both sides of the interruption in the region 22 of the interruption of the clamp 4. A parallel opening 9 is arranged laterally to the through-hole 8 so that a screw 6 for providing a threaded connection 7 can be inserted laterally into the through-hole 8 via the opening 9. The screw 6 now engages through the opening 8 on an internal thread in the region 2b of the display 2 and, when actuated accordingly, compresses both the display 2 and the two parts 4a, 4b of the clamp 4 such that the latter is fixed jointly on the handle 3 and the display 2 on the clamp 4.

In one embodiment not shown here, the clamp 4 can be formed in one piece and made from flexible plastic so that it can be reversibly bent up—due to the flexible plastic—to arrange it around the handlebar 3.

In summary, at least one of the embodiments of the disclosure provides at least one of the following advantages and/or has at least one of the following features: (i) positive integration of a display into a handlebar, (ii) flexibility in the arrangement of the display on different handlebars, (iii) simple, reliable mounting, (iv) single fixing element, and (v) reliable fixing of the display on a handlebar.

Although the present disclosure has been described with reference to preferred embodiments, it is not limited thereto and can instead be modified in a variety of ways.

What is claimed is:

1. An apparatus for fixing a display device on a handlebar, comprising:
   a holding device configured to be fixed to the handlebar in a closed state;
   a fixing device arranged on the holding device and configured to receive the display device; and
   a fixing element configured to (i) releasably retain the holding device in the closed state, and (ii) fix the display device to the fixing device,
   wherein the holding device comprises:
      a first opening defined through a portion of the holding device in a first direction and configured to receive the fixing element in an axial direction of the fixing element, and
      a second opening communicating with the first opening and arranged laterally relative to the first opening, the second opening configured to receive the fixing element in a lateral direction.

2. The apparatus according to claim 1, wherein the fixing device is configured for positively locking reception of the display device.

3. The apparatus according to claim 1, wherein the fixing element is configured to provide a threaded connection, a spread connection and/or a latch connection.

4. The apparatus according to claim 1, wherein the holding device is made of a flexible material.

5. The apparatus according to claim 1, wherein the fixing device is configured as an elongated recess defined in the holding device.

6. The apparatus according to claim 1, wherein the holding device is configured in the form of a clamp.

7. The apparatus according to claim 6, wherein the clamp is formed in at least two parts.

8. The apparatus according to claim 7, wherein the at least two parts are pivotable with respect to one another about a hinge.

9. The apparatus according to claim 7, wherein two of the at least two parts each include a radial projection through which the first and second openings are defined.

10. The apparatus according to claim 9, wherein the second opening opens in a radial direction.

11. An apparatus for fixing a display device on a handlebar, comprising:
    a holding device configured to be fixed to the handlebar in a closed state;
    a fixing device arranged on the holding device and configured to receive the display device; and
    a fixing element configured to (i) releasably retain the holding device in the closed state, and (ii) fix the display device to the fixing device,
    wherein the holding device includes:
       a first opening configured to receive the fixing element in one direction, and
       a second opening along the one direction that communicates with the first opening,
    wherein the holding device is configured in the form of a clamp, and
    wherein the clamp includes a recess having an upper region configured to receive and engage a projection of the display device so as to positively lock with the display device.

12. A fixing system, comprising:
    a display device;
    a holding device configured to be fixed to a handlebar of a single-lane vehicle;
    a fixing device arranged on the holding device and configured to fix the display device; and
    a fixing element arranged jointly, wherein the fixing element is configured to fix the holding device to the handlebar, and the display device to the fixing device,
    wherein the holding device comprises:
       a first opening defined through a portion of the holding device in a first direction and configured to receive the fixing element in an axial direction of the fixing element, and
       a second opening communicating with the first opening and arranged laterally relative to the first opening, the second opening configured to receive the fixing element in a lateral direction.

13. A steering element system for a single-lane vehicle, comprising:
    a fixing system according to claim 12; and
    a steering element of the single-lane vehicle,
    wherein the holding device is configured to positively lock on the steering element.

14. The fixing system according to claim 12, wherein the fixing device is configured as an elongated recess defined in the holding device.

15. The fixing system according to claim 14, wherein the display device includes a projection that positively locks in the elongated recess when the display device is fixed to the holding device.

16. The fixing system according to claim 12, wherein the holding device is configured in the form of a clamp.

17. The fixing system according to claim 16, wherein the clamp is formed in at least two parts.

18. The fixing system according to claim 17, wherein two of the at least two parts each include a radial projection through which the first and second openings are defined.

19. The fixing system according to claim 18, wherein the second opening opens in a radial direction.

20. The fixing system according to claim 19, wherein the display device includes a straight projection that abuts on one of the radial projections when the display device is fixed to the holding device by the fixing element.

21. The fixing system according to claim 20, wherein, when the display device is fixed to the holding device, the fixing element extends through the first opening and into a threaded opening of the straight projection such that the fixing element clamps the two of the at least two parts together and fixes the display device to the holding device.

\* \* \* \* \*